Aug. 9, 1955  B. WILSON  2,715,056
METHOD OF AND APPARATUS FOR VAPOR STERILIZATION OF AIR
Filed Dec. 23, 1948  3 Sheets-Sheet 1
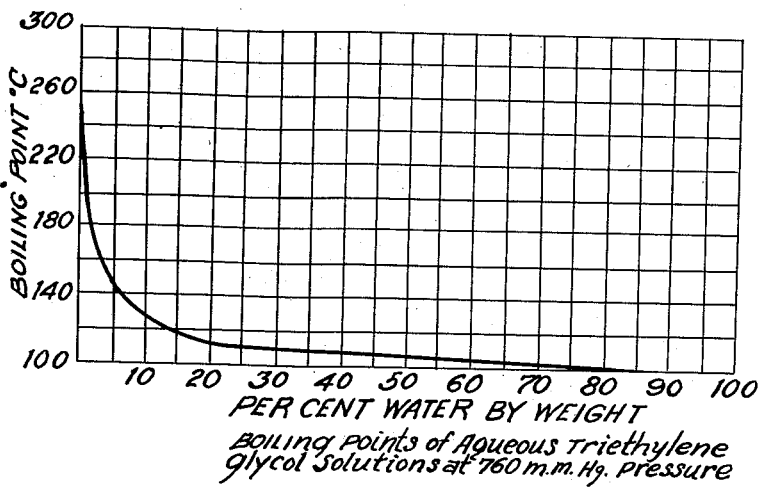
Fig. 1.
Boiling Points of Aqueous Triethylene Glycol Solutions at 760 m.m. Hg. pressure
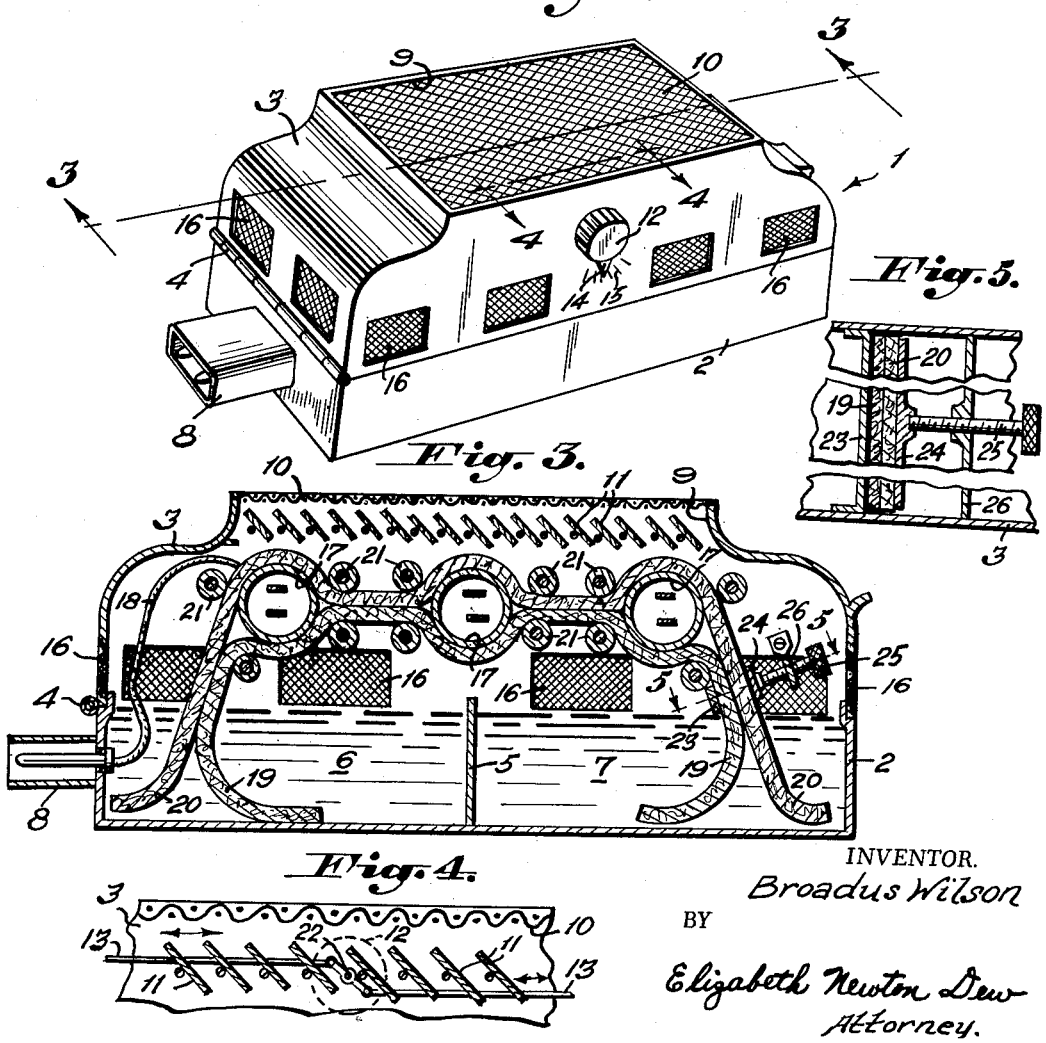
INVENTOR.
Broadus Wilson
BY
Elizabeth Newton Dew
Attorney.

Aug. 9, 1955　　　　B. WILSON　　　　2,715,056
METHOD OF AND APPARATUS FOR VAPOR STERILIZATION OF AIR
Filed Dec. 23, 1948　　　　3 Sheets-Sheet 2
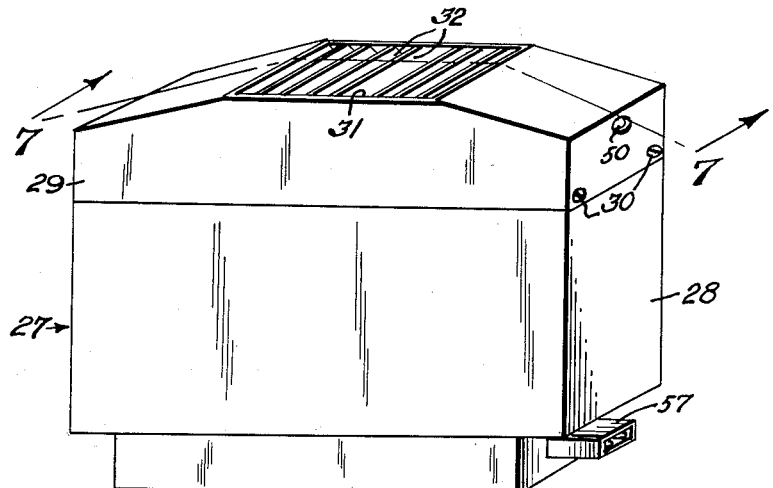
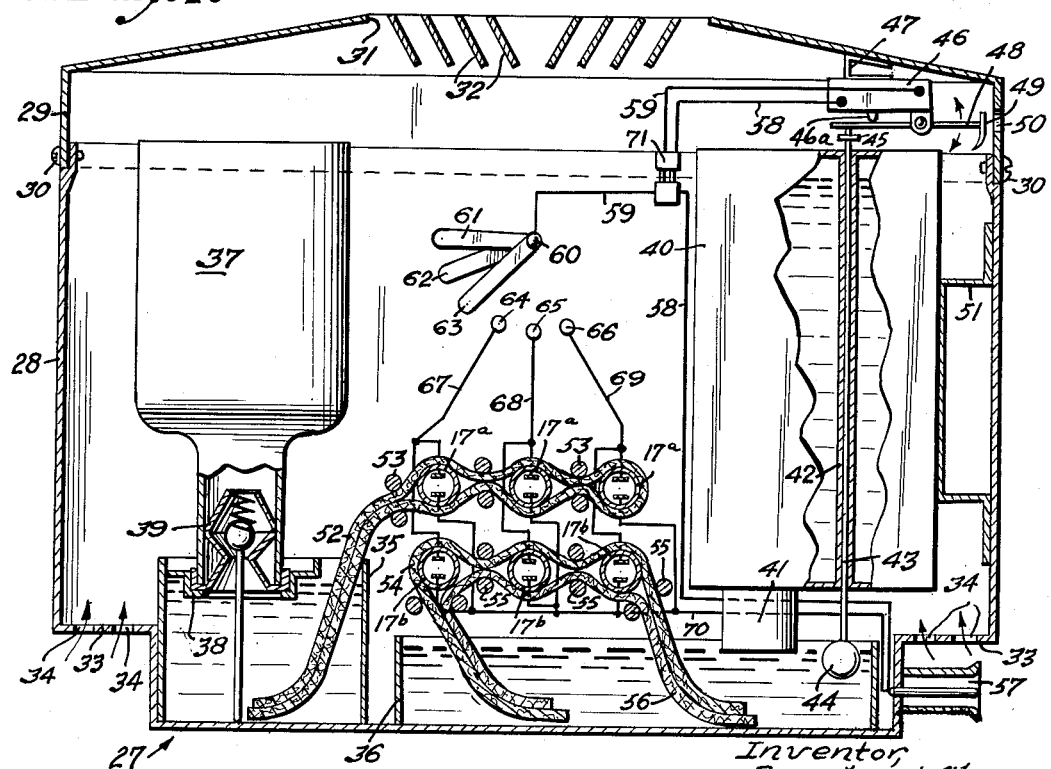
Inventor,
Broadus Wilson
By: Elizabeth Newton Dew
Attorney.

Aug. 9, 1955 B. WILSON 2,715,056
METHOD OF AND APPARATUS FOR VAPOR STERILIZATION OF AIR
Filed Dec. 23, 1948 3 Sheets-Sheet 3
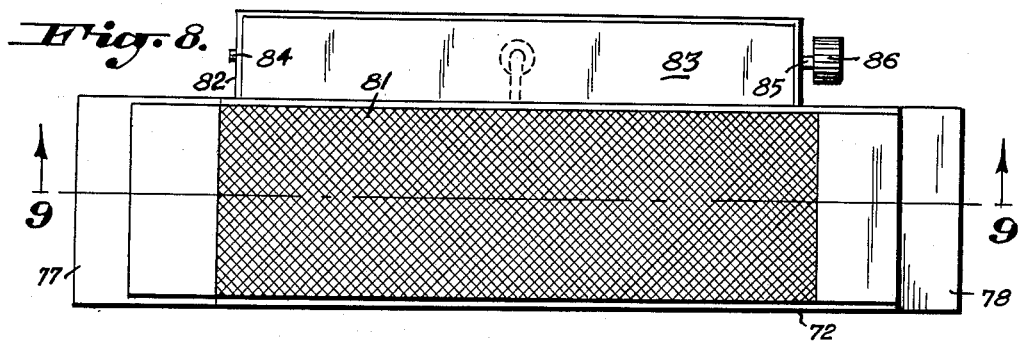
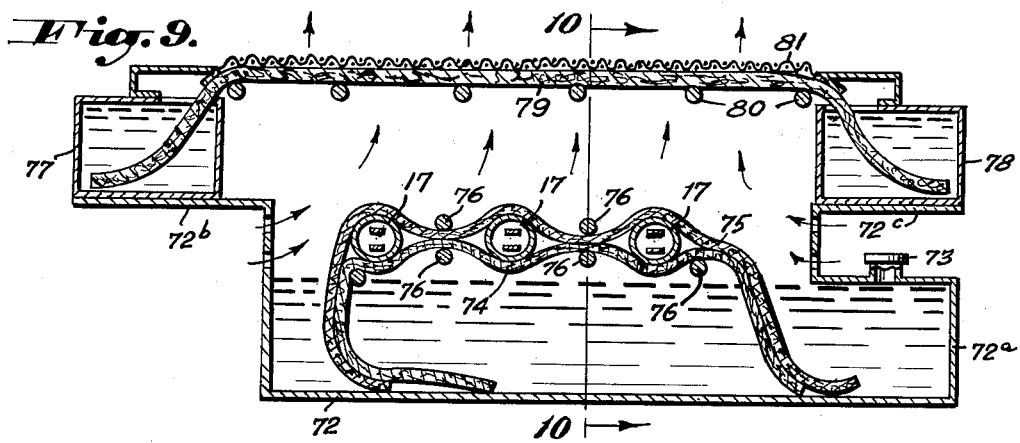
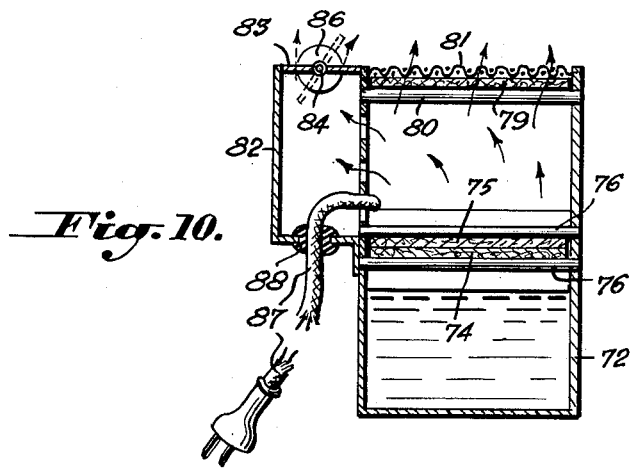
INVENTOR.
Broadus Wilson
BY
Elizabeth Newton Dew
Attorney.

United States Patent Office 2,715,056
Patented Aug. 9, 1955

2,715,056
METHOD OF AND APPARATUS FOR VAPOR STERILIZATION OF AIR

Broadus Wilson, Raleigh, N. C.

Application December 23, 1948, Serial No. 67,024

15 Claims. (Cl. 21—53)

This invention relates to a method of and apparatus for the sterilization of air by means of the well-known bactericidal and fungicidal action of triethylene glycol (TEG).

Triethylene glycol hereinafter called "glycol" in undiluted liquid form has a relatively high boiling point of about 280° C. so that relatively high temperatures are required to evaporate the undiluted liquid. The addition of water effects a rapid lowering of the boiling point of the solution. Thus, for example, a solution having 10% by weight of water has a boiling point of about 130° C. while for all solutions having water, by weight, above 30%, the boiling point is but little above that of water alone. For this reason where glycol vapor is used for air sterilization, it is customary to mix glycol with water to facilitate its vaporization at a lower temperature than would otherwise be possible. However, even in solutions, the water evaporates more rapidly than the glycol with the result that the concentration of glycol in the solution increases and, of course, with each such increase, there is a resulting increase in the boiling point.

Consequently, where a water solution of glycol is used, if the amount of glycol vapor is to be maintained constant in the room or space being treated, a close control of the percentage of glycol in the solution must be maintained, requiring the continual addition of water. Or, in lieu of that, a continual rise in the vaporizing temperature must be effected, which rise should increase at an increasing rate as the concentration of glycol in the solution increases.

The principal object of the invention is to provide a process and apparatus for maintaining a constant strength of a solution of two liquids having different vapor pressures, during vaporization of the solution.

Another important object of the invention is to provide a method of and apparatus for the dispersion of glycol vapor in which the disadvantages mentioned in the preceding paragraphs are overcome and in which the concentration of glycol vapor per unit volume of air may be easily regulated and controlled.

Another object is to provide an apparatus and method by which glycol vapor may be produced in a controlled manner without the previous mixing of the glycol with water.

Another object is the provision of a method for controlled formation and dispersion of glycol vapor by evaporating water beneath a wick or other porous absorbent material saturated with glycol.

A still further object is the provision of an air-sterilization apparatus which may be adjusted to control the humidity and amount of glycol per cubic unit of air in the space or room being conditioned.

Another object is the provision of an instrument in which the concentration of glycol vapor may be maintained constant as long as the supplies of water and liquid glycol are maintained.

Still another object is the provision of an instrument having the advantages aforesaid but which has no moving parts, is simple to service and operate, inexpensive to maintain, and efficient and reliable in operation.

Other objects and advantages of the invention will be apparent after a study of the following description with the drawings.

On the drawings:

Figure 1 is a diagram showing the variation in the boiling point of an aqueous solution of triethylene glycol and wherein ordinates represent the boiling point in degrees centigrade and abscissae represent the percent of water by weight in the solution.

Figure 2 is a perspective view showing a first embodiment which the invention may have.

Figure 3 is a central longitudinal section taken in a plane indicated by the line 3—3 of Figure 2.

Figure 4 is a detail sectional view to an enlarged scale of the shutter or louvre control for the model shown in Figures 2 and 3.

Figure 5 is a detail sectional view to an enlarged scale of a feature for controlling the amount of liquid drawn upwardly by the wicks.

Figure 6 is a perspective view of a second embodiment of the invention.

Figure 7 is a central vertical section taken in a plane indicated by the line 7—7 of Figure 6.

Figure 8 is a top plan of a third embodiment of the invention.

Figure 9 is a central vertical section taken in a plane indicated by the line 9—9 of Figure 8, and Figure 10 is a transverse vertical section taken in a plane indicated by the line 10—10 of Figure 9.

Referring in detail to the drawing, and particularly to Figure 1, it will be noted that the boiling point of an aqueous solution of triethylene glycol has an initial rapid decrease with increase in the percentage of water. Thus, the boiling point decreases from about 260° C., a drop of 130°, for a solution containing only 10% by weight of water. It will also be noted that the rate of decrease falls off rapidly with additional percentages of water so that a solution containing 20% of water has a boiling point of about 110° C. or a decrease of 20° C. The diagram therefore shows that glycol vapor may be produced at much lower temperatures from an aqueous solution and that such solution should have a minimum percentage of 10% water by weight. It also shows that the proportion of water may be varied within wide limits above 10% without materially altering the boiling point of the solution.

However, when such a solution is heated, the water evaporates more rapidly than the glycol and hence the percentage of glycol and the boiling point of the remaining solution, will increase unless water is continuously added to the solution. Under such conditions, a constant rate of evaporation of glycol can be maintained only by a continuous increase in the heat input rate. However, such an increase will still further increase the rate of evaporation of water and will make it difficult if not impossible to control the humidity of the air in the space being conditioned. Since it is well known that glycol vapor is most effective when the relative humidity is between 45% and 60% it follows that, under the conditions outlined, it is difficult to utilize the glycol vapor to obtain the most effective sterilization action. Furthermore, as the air approaches the saturation point the quantity of glycol vapor which a given volume of air can hold, decreases, so that the germicidal effect also decreases.

The foregoing difficulties and drawbacks are overcome in my invention, one form of which is shown in Figures 2 to 5, wherein 1 identifies generally a casing, including a base 2 and cover 3 hinged together at 4. The base 2 has a liquid-tight partition 5, Figure 3, dividing the volume thereof into a first reservoir 6, for glycol, and a second reservoir 7 for water. The base also has a plug-in socket 8 for supplying heat as subsequently explained. The cover 3 may conveniently have the general form shown with a relatively snug fit over and about the inwardly-crimped upper edge of base 2. The top opening 9 in cover 3 is shown with a protective grille or screen 10. The effective discharge capacity of opening 9 may be varied in any suitable way, as by a set of louvres 11 pivoted on spaced parallel normally horizontal axes just below screen 10 and interconnected in any well-known manner, as by links 13, for simultaneous adjustment by a knob 12 mounted on the outside of cover 3. If desired, a point 14 fixed with the knob cooperates with a scale 15 on cover 3 to indicate the adjustment of the louvres. A plurality of screened air inlets 16 are located in and about the lower edge of cover 3.

A number of conventional resistance strip heater units 17 are mounted in horizontally-spaced parallel relation on one inner side of cover 3, and are supplied with current from a cable 18 leading from socket 8. A pair of wicks 19 and 20 each have one end dipping into reservoir 6 and the other end dipping into reservoir 7. These wicks are guided and held in position extending over and about the heater units 17, by any suitable means shown as a series of rods 21 fixed to the side walls of cover 3 in parallel relation. Thus, wick 19 extends about and beneath the heater units 17 while wick 20 extends over and about them. To control the amount of water drawn up by wicks 19 and 20, a clamping device may be used. As shown, this device consists of a backing plate 23 rigidly attached between the side walls of cover 3 and passing on one side of and closely adjacent the wick portions leading from water reservoir 7, and a clamp plate 24 mounted for movement toward and from plate 23 under control of a thumbscrew 25 threadedly carried by a plate 26 fixedly carried by cover 3. As screw 25 is turned down, the wicks are clamped between plates 23 and 24 and the amount of water which is drawn upwardly by the wicks is varied. It is contemplated that a similar adjusting and regulating clamp may be used on that portion of the wicks between the glycol in reservoir 6 and the heater units.

In operation of this form of the invention, it is merely necessary to open cover 3 and fill the reservoirs 6 and 7 with glycol and water, respectively. Connection with a source of current is then made at socket 8. One of the ends of each wick thereby absorbs water while the other ends absorb glycol. The two liquids are mixed within the wicks to form a solution which is then vaporized by glycol heaters 17a and water 17b, the vapor passing upwardly through screen 10 to the room. The proportions of water and glycol in the solution admixed by the wicks may be varied by adjustment of thumbscrew 25 to vary the clamping pressure upon the wicks. If desired, of course, a second clamp may be used for that portion of the wicks immediately above glycol reservoir 6. Thus the evaporation of an excess of water may be avoided as in seasons when it is not necessary to heat the space being conditioned.

Assuming a fixed position of screw 25, the proportion of glycol and water within the wicks will remain constant as long as a supply of water and glycol remains in the reservoirs. In this manner the amount of glycol vapor dispersed per unit time may be maintained substantially constant.

In Figures 6 and 7 is disclosed a second form of the invention. A casing indicated generally at 27 includes a base portion 28 and a cover 29 snugly fitted over and about the inwardly-crimped upper edge of base 28 and removably secured thereto, as by screws 30. The top has an opening 31 for the escape of vapor. This opening may be protected by a grille 32. If desired a set of pivoted louvres, as shown for the form of the invention of Figure 2 through 5, may be added to control the effective area of the escape opening.

The base 28 has a lower section reduced in area by an offset or flange 33 in which entrance holes 34 for air are conveniently provided. The base 28 has a reservoir 35 for glycol and a second reservoir 36 for water. The supply of glycol within reservoir 35 may be kept at a constant level by an inverted bottle or jar 37 whose open end is held by a support 38. If desired the glycol supply bottle may be provided with any known non-refillable valve mechanism generally indicated at 39.

The supply of water within reservoir 36 is replenished and maintained at constant level by a removable tank 40 having a filler neck 41 at the bottom and projecting downwardly to the correct level for water in the reservoir. Tank 40 has a tube 42 secured in and opening through its top and bottom. A rod 43 slides in the tube and has a float 44 secured to its lower end within reservoir 36 and a collar 45 attached to its upper end. A microswitch 46 is fixed, as by a bracket 47, to cover 29. The plunger 46a of the switch is positioned for actuation to "off" or "on" position by a lever 48 pivoted intermediate its length to the switch casing and bearing a signal 49 at one end. This signal is viewable through a window 50 in the cover 29. Lever 48 is positioned to be engaged by the upper end of rod 43, and the relation of the parts is such that when the water in reservoir 36 is at the proper level, float 44 acts in an obvious manner to close switch 46 while at the same time moving a green signal opposite window 50. However, when the supply of water is exhausted or is dangerously low, the float drops and opens switch 46 while at the same time bringing a red area of signal 49 opposite window 50. A protective device is thus provided which makes it impossible to energize the heaters unless and until an adequate supply of water is provided. The tank 40 may be removably held in inverted position in base portion 28 by any suitable means such as a bracket 51.

A set of six heater units 17 are shown. These may be identical with the units shown in Figure 4. Three of these units are used for heating glycol while three others each positioned below a corresponding glycol heater, are used for evaporating water. A wick 52 has its end dipping into the glycol reservoir and, guided by rods 53, extends first over and about the uppermost three heaters thence about and beneath them to the reservoir. A slightly different arrangement of the water wick is shown. Here a first wick 54 is shown with its ends dipping into the tank 36 and is guided by rods 55 over and in intimate contact with the heaters. A second wick 56 is guided beneath and about the heaters.

Current to energize the heater units is introduced by a socket 57 from which one lead 58 extends to one terminal of switch 46. A second lead 59 extends from the other terminal of switch 46 to the common terminal 60 of a switch having three blades 61, 62, and 63 rigidly connected for pivotal movement as a unit about terminal 60 as a center. Three terminals 64, 65 and 66 have respective leads 67, 68 and 69 each connected to a common lead 70 returning to the second contact of socket 57. Each lead 67, 68 and 69 includes a glycol heater unit 17a and a water heater unit 17b, in parallel. For example lead 67 supplies the left glycol heater 17a and the left water heater 17b, the two being in parallel. A button or lever, not shown, together with a suitable position indicator or dial, is mounted externally on the side of base 28 and connected for turning the blade assembly 61, 62 and 63. Thus, in a first position, blade 63 contacts terminal 64 and one pair of heaters only is placed in circuit. In a second positon, blade 62 and 63 contact terminals 64 and 65, respectively, to place two pairs of heaters in circuit. In a third position, blades 61, 62 and 63 contact terminals 64, 65 and 66, respectively, to energize all of the heaters. The rate of evaporation may thereby be controlled by the number of pairs of heaters energized. Leads 58 and 59 pass through a separable connector, so that cover 29 is readily removable.

The operation of this form of the invention will be clear from the foregoing description. A bottle of glycol is inverted and positioned on support 38 while tank 40 is removed, filled with water and replaced in the position shown. The glycol and water then rise to levels covering the open ends of the respective containers. These levels are maintained as long as there is a supply of liquids. Cover 29 is replaced and connection is made at socket 57 with a current supply. Depending upon the volume or size of the space being conditioned, contact blades 61, 62 and 63 are turned as a unit to one of the three positions previously described. In the first position the output rate of glycol vapor will be lowest as but two heaters will be in operation, while in position three the rate will be the most rapid for the instrument since all heater units will be energized. If desired, of course, the initial setting may be in position three until the desired concentration may be maintained with less than six heaters in operation. The affinity of glycol and water is a well-known physical fact. As one or more heaters 17b are energized, water vapor is produced at an accelerated rate from the water in wicks 54 and 56. This vapor rises and mixes with the heated glycol in wick 52. The production of glycol vapor from the wick is thereby facilitated, which vapor then passes out of opening 31 into the space being conditioned. A very effective and constant concentration of sterilization vapor within the room may thus be maintained. When the water in tank 40 has reached a predetermined low level, float 44 permits lever 48 to pivot until a red signal is exposed through window 50. At the same time, switch 46 is opened to prevent further energization of any of the heater units until the supply of water has been replenished. If desired a similar signal and safety switch may be provided for the glycol reservoir. In such a case, the glycol and water reservoir switches will be in series so that a drop of either liquid to a low level will make replenishment necessary before any of the heaters may be energized.

In Figures 8, 9 and 10, I have shown a third form of the invention wherein heat is applied only to the water wicks. A casing 72 is formed to provide a water reservoir in its base with an offset portion 72a affording a filler opening and cap 73. A series of heater units 17 are mounted in the casing walls in the same manner and relative positons as the corresponding units of Figure 3. A pair of wicks 74 and 75 are positioned with their ends dipping into the water reservoir and are held in guided position under and over heater units 17, by a series of pins 76.

A pair of glycol tanks 77 and 78 are fixed to and supported by flanges 72b and 72c at respective opposite ends of the casing. Each tank or receptacle has an opening through its top through which the respective ends of a wick 79 pass into the tanks. The central portion of wick 79 is supported in a substantially plane pass near the top of the casing, by a series of rods 80 which have their ends secured in the casing walls just below the top edges thereof. A screen or grille 81 has its edges secured to the adjacent edges defining the top opening of the casing. As shown in Figures 8 and 10, the casing 72 has a side extension defined by walls 82. This extension is open only at the top. A butterfly type valve 83 has aligned pintles 84 and 85 secured to the central portion of its end edges. Pintle 85 carries a knob 86 whereby the valve 83 may be adjusted to vary the effective opening through the top of extension 82, as will be obvious from Figure 10. Current for energizing heater units 17 is conveniently supplied by a cable 87 passing through an aperture in the bottom of extension 82 and insulated therefrom by rubber grommet 88. The heater units are connected in parallel by conventionally-arranged wiring, not shown, within the casing.

The operation of this form of the invention is essentially the same in general principle as the two forms first described. Water absorbed by wicks 74 and 75 is heated by units 17 and the resulting vapor rises and mixes with glycol in wick 79. The resulting glycol vapor then passes out through the top of extension 82. Likewise some of the vapor may pass directly through the wick 79 and screen 81. By means of valve 83 the percentage or concentration of glycol in the vapor, may be regulated to a certain extent. In this form, the wicks 74 and 75 may, if desired, be provided at one or both ends, with pressure plates such as 23 and 24, Figure 3, to regulate the rate of vaporation of water. In this form, as well as that shown in Figures 2 through 5, it is contemplated that switch mechanism such as 60, 61, etc., Figure 7, may be provided whereby one, two or all heater units may be energized as desired. It is also contemplated that pintle 85 may be automatically operated and controlled by a humidistat being opened to a greater extent with a decrease in relative humidity and closed as the relative humidity attains the optimum range of effectiveness for glycol vapor if about 45% to 60%.

I have provided a simple but highly efficient mechanism for the production and dispersion of glycol vapor, whereby a room or other space may be conditioned at all times desired and the occupants thereof protected against numerous types of air-borne sickness and disease. Since the water and liquid glycol are in separate tanks or containers, the concentration of vapor dispersed remains constant for any given adjustment as long as supplies of glycol and water remain. At the same time, the instrument has no moving parts and may be quickly and easily serviced. The principle thus employed is of general utility in those cases where it is desired to facilitate the evaporation of a liquid having a relatively low vapor pressure.

It will be understood that, in all forms of the invention, a rheostat may be used to control the rate of heat output of the heaters. This is true of the species of Figures 6 and 7 where rheostat control means may replace the switch mechanism 60–66 without any substantial alteration in the operation of the instrument. Such a rheostat might be controlled automatically, by means of a glycol vapor sensitive instrument, as well as manually.

While I have shown several forms which the invention may have, it will be clear after a study of the foregoing description that a number of mechanical changes and modifications are possible without in any way altering the basic principle of operation. Hence the foregoing description should be taken in an illustrative rather than a limiting sense; and it is my desire and intention to reserve all modifications falling within the scope of the subjoined claims.

In the claims, the term "separate" used in connection with the reservoirs, means that the reservoirs have no passageways for the transfer of liquids therebetween.

Having now fully described the invention, what I claim and desire to secure by Letters Patent is:

1. That method of producing sterilizing vapor of water and triethylene glycol comprising evaporating said triethylene glycol from an absorbent material continuously saturated therewith, while aiding such vaporization by continuously passing water vapor over and in direct contact with the liquid-saturated portion of said absorbent material, whereby the vapor pressure of the triethylene glycol is raised.

2. That method of producing a sterilizing vapor comprising immersing the ends only of an absorbent wick into water and liquid triethylene glycol respectively, and applying heat to that portion of the wick in which the liquids intermingle.

3. That method of producing and dispersing a sterilizing vapor comprising, heating the mid portion of an absorbent wick having its respective ends only immersed in separate bodies of water and a liquid whose vapor has sterilizing properties, and applying pressure to said wick between one liquid externally thereof and said mid portion to thereby regulate the relative proportion of said liquid in the resulting vapor.

4. That method of producing and dispersing a sterilizing vapor of triethylene glycol comprising, immersing the respective ends of an absorbent wick into separate reservoirs of water and triethylene glycol to thereby cause said liquids to intermingle in a mid portion of said wick external of said liquids, and heating the intermingled liquids in said mid portion to effect vaporization at the point of the intermingled liquids.

5. In an air sterilizer, first and second separate liquid reservoirs, an absorbent wick having its ends dipping into said reservoirs, respectively, and heater means external of said reservoirs, said wick having a mid portion thereof external of said reservoirs in heat absorbing relation with said heater means.

6. An air sterilizer as recited in claim 5, and means adjustable to apply pressure to said wick between one end external of one reservoir and said mid portion.

7. In an air sterilizer, a casing having an open top, first and second separate liquid containers mounted in said casing, electric heater means fixed in said casing over said containers, a wick having distinct first and second portions thereof passing into said containers respectively, and means maintaining a third distinct portion of said wick in heat-absorbing relation with said heater means.

8. An air sterilizer comprising a casing having entrance and discharge openings therein, a first container for water in said casing, a second container for glycol in said casing, a plurality of heaters mounted in said casing in spaced relation over said containers, first and second wicks said first wick having its ends extending into respective ones of said first and second containers and said second wick having its ends extending into respective ones of said first and second containers, and means carried by said casing and guiding the intermediate portions of said first and second wicks in generally horizontal contiguous superposed relation, said means holding at least one of said wicks about said heaters in heat-exchange relation therewith.

9. A sterilizer as recited in claim 8, and means operable to apply pressure to at least one said wick between the ends of said wick dipping into one said container and said heater means, said means being adjustable to vary the rate of flow of liquid from said one container to said heaters.

10. In an air sterilizer, a casing, first and second separate liquid containers mounted in said casing, first and second heaters mounted in adjacent superposed relation in said casing, a first wick having a portion in heat absorbing contact with said first heater and extending into said first container, and a second wick having a portion in heat absorbing contact with said second heater and extending into said second container, said portions being in generally horizontal contiguous superposed relation.

11. An air sterilizer and conditioner comprising a casing, a water container in said casing, a glycol container in said casing, and separate from said water container, a plurality of heater units carried by said casing externally of said tanks, a first wick having at least one end dipping into said water container and a generally horizontal portion extending over and about said heater units in contact therewith, a second wick having one end at least dipping into said glycol container, and means supporting a generally horizontal portion of said second wick in superposed contiguous relation over said heater units and the horizontal portion of first wick.

12. The method of maintaining a constant strength solution of water and triethylene glycol, during vaporization thereof, comprising, vaporizing the water, and passing the vapor so produced over and about an absorbent article continuously saturated with the triethylene glycol to produce a resultant vapor of a mixture of said two liquids.

13. In a device for sterilizing the ambient air, a casing having air entrance and discharge openings in its walls, a first container for water in said casing, a second container for triethylene glycol in said casing, an electric heater in said casing and capable of sustained energization from a source of electrical energy external of said casing, a first wick having at least one end extending into said first container, a second wick having at least one end extending into said second container, and means fixed within said casing and engaging and positively guiding generally horizontal portions of both said wicks in superposed contiguous relation externally of said containers and within said casing, at least the generally horizontal portion of said first wick being in contact with said heater.

14. In a device for sterilizing ambient air, a casing having a base portion with openings for entering air and a cover portion with openings for discharging air, first and second discrete liquid containers mounted in said base portion, a first plurality of electric heaters mounted in horizontally-spaced side by side relation in said casing, a second plurality of electric heaters mounted in side by side horizontally-spaced relation in said casing and directly superposed over and adjacent said first plurality of heaters, a first wick, means carried by said casing and guiding said first wick about and in contact with said first plurality of heaters, the ends of said first wick extending into said first liquid container, a second wick, means carried by said container and guiding said second wick about and in contact with said second plurality of heaters, said second wick extending into said second liquid container, reservoir means maintaining a constant level of a first liquid in said first container, reservoir means maintaining a constant level of liquid in said second container, an electric socket carried by said casing externally thereof, and an electric circuit within said casing and connecting said socket and heaters.

15. In a device for dispensing glycol vapor at constant concentration, a casing having air inlet and outlet openings in its bottom and top portions, respectively, first and second discrete liquid containers in said casing adjacent the bottom portion thereof, a first plurality of electric heater elements mounted in said casing in spaced side-by-side relation in a normally horizontal first plane, a second plurality of electric heater elements mounted in said casing in spaced side-by-side relation in a normally horizontal second plane above and adjacent said first plane, a first wick, means carried by said casing guiding a first portion of said first wick over and about said first plurality of heaters, said first wick having a second portion extending into said first container for absorption of liquid therefrom, a second wick, means carried by said casing guiding said second wick over and about said second plurality of heaters, said second wick having a second portion extending into said second container for absorption of liquid therefrom, said first portions of said first and second wicks being generally horizontal and superposed in contiguous relation, a first reservoir directly supplying liquid to said first container to maintain a constant level of liquid therein, a second reservoir directly supplying liquid to said second container to maintain a constant level of liquid therein, electric contacts carried by said casing externally thereof, and an electric circuit within said casing for connecting said contacts and heaters.

References Cited in the file of this patent

UNITED STATES PATENTS

| Number | Name | Date |
|---|---|---|
| 902,622 | Subert | Nov. 3, 1908 |
| 1,112,807 | King | Oct. 6, 1914 |
| 1,145,218 | Schimmel | July 6, 1915 |
| 1,718,182 | Rose et al. | June 18, 1929 |
| 1,806,020 | Parker et al. | May 19, 1931 |
| 2,152,466 | Clyne | Mar. 28, 1939 |
| 2,205,831 | Hartman | June 25, 1940 |
| 2,344,536 | Coey et al. | Mar. 21, 1944 |
| 2,369,900 | Jennings et al. | Feb. 20, 1945 |
| 2,434,825 | Williams et al. | Jan. 20, 1948 |
| 2,465,762 | Supplee | Mar. 29, 1949 |

FOREIGN PATENTS

| 17,830 | Great Britain | Aug. 14, 1902 |

OTHER REFERENCES

"Industrial Carbon," by C. L. Mantell, D. Van Nostrand Co., Inc., New York, 2nd ed. (1946), p. 176.